United States Patent [19]

Dyer

[11] Patent Number: 4,899,031
[45] Date of Patent: Feb. 6, 1990

[54] PULSED ELECTRICAL HEATING OF CONCRETE

[75] Inventor: David F. Dyer, P.O. Box 2255, Auburn, Ala. 36831

[73] Assignee: David F. Dyer, Auburn, Ala.

[21] Appl. No.: 271,120

[22] Filed: Nov. 14, 1988

[51] Int. Cl.$^4$ .............................................. H05B 1/00
[52] U.S. Cl. .................................... 219/213; 219/492; 249/78
[58] Field of Search ................... 249/78; 219/200, 213, 219/274, 492, 201

[56] References Cited

U.S. PATENT DOCUMENTS

| | | | |
|---|---|---|---|
| 3,596,351 | 8/1971 | Tilton et al. | 249/78 |
| 3,659,077 | 4/1972 | Olson | 219/213 |
| 3,676,641 | 7/1972 | Olson | 219/200 |
| 3,729,614 | 4/1973 | Martinet | 219/274 |
| 4,238,105 | 12/1980 | West | 249/78 |

FOREIGN PATENT DOCUMENTS

| | | | |
|---|---|---|---|
| 7928 | 2/1980 | European Pat. Off. | 219/492 |
| 1025835 | 6/1983 | U.S.S.R. | 249/78 |

Primary Examiner—A. D. Pellinen
Assistant Examiner—Geoffrey S. Evans

[57] ABSTRACT

A method of curing green concrete using electric heating elements that are pulsed on and off by a programmable controller that controls a power source wired to an electric power main. A temperature probe may be used to inform the programmable computer of the concrete's temperature.

3 Claims, 3 Drawing Sheets

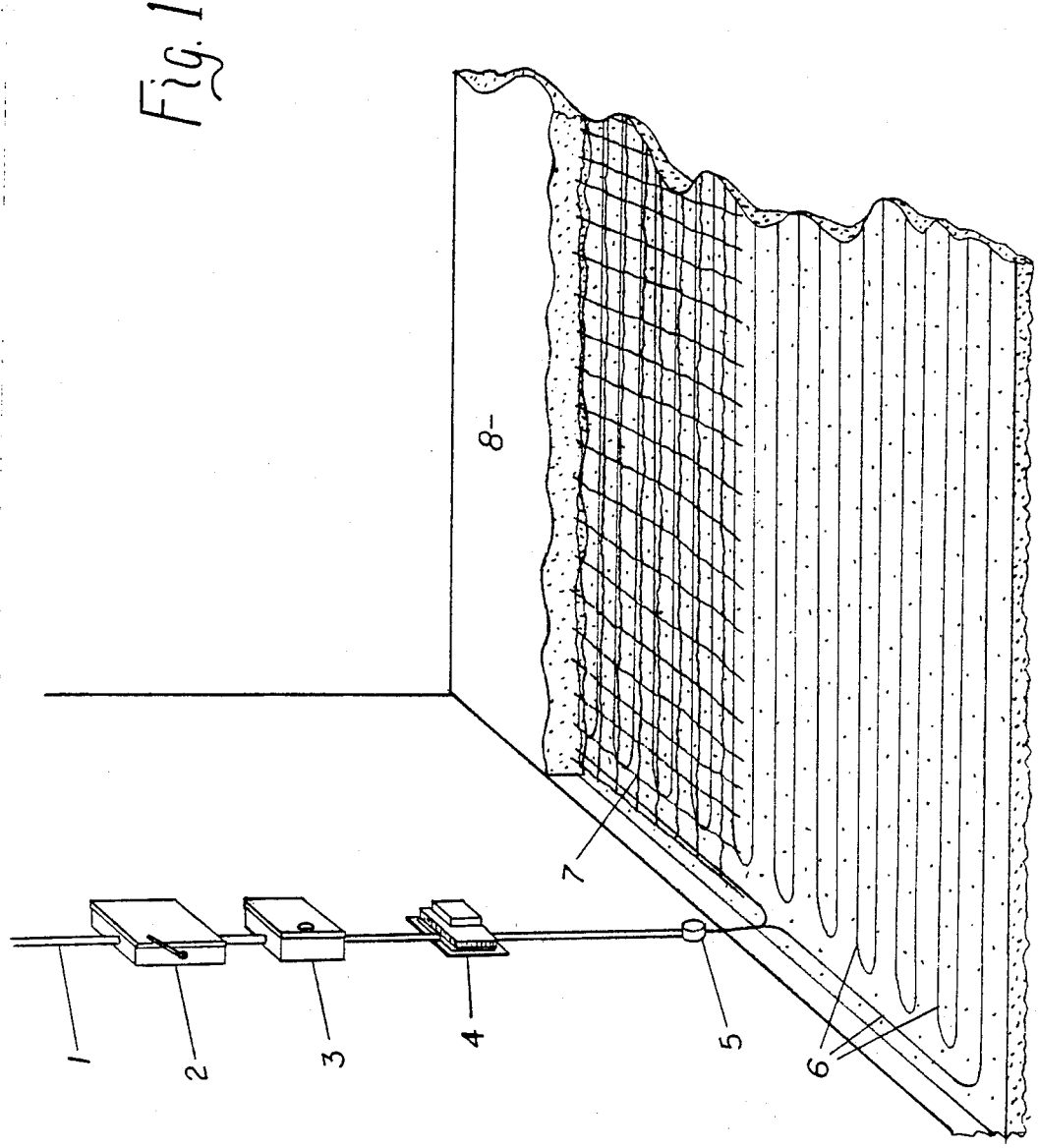

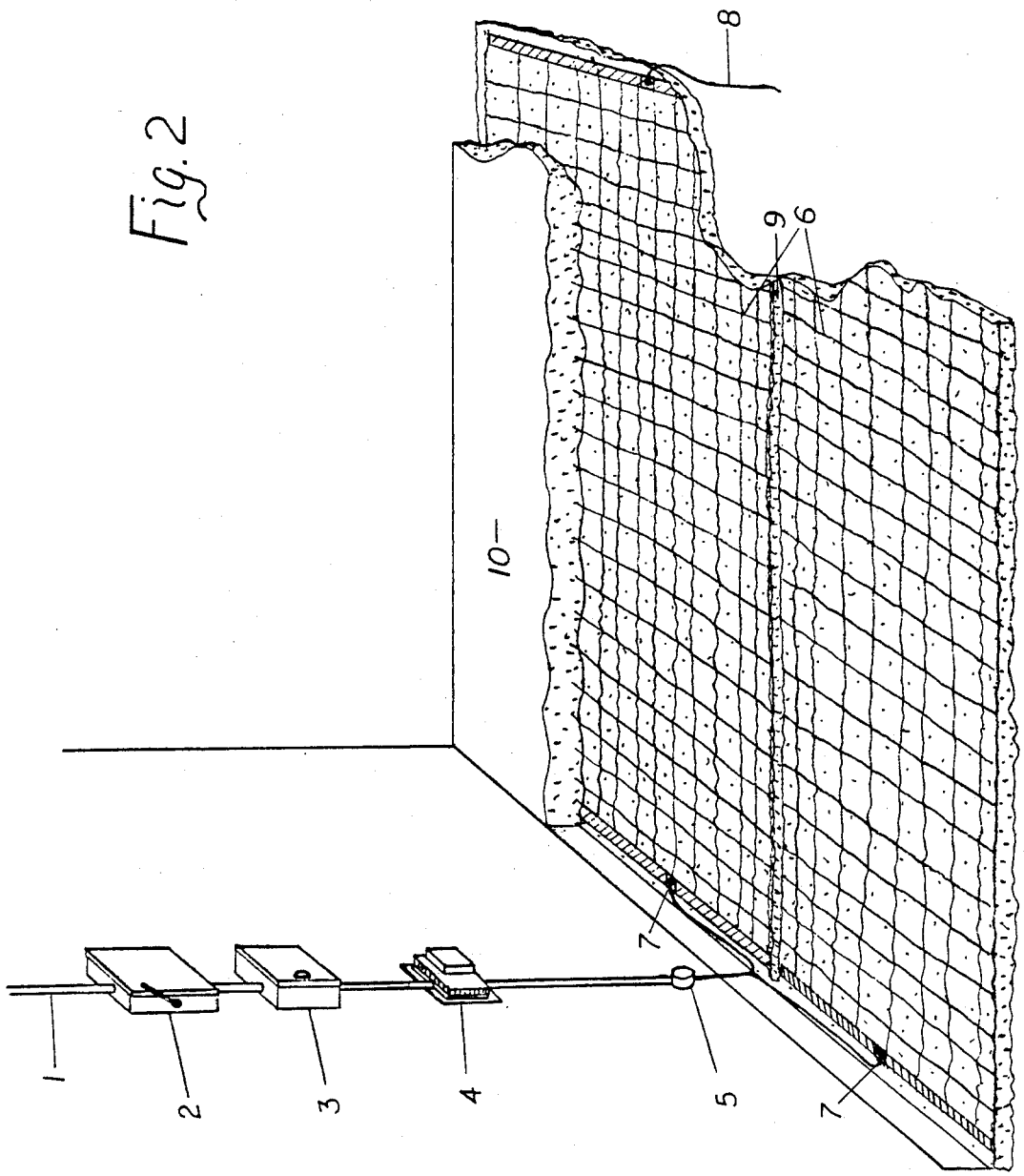

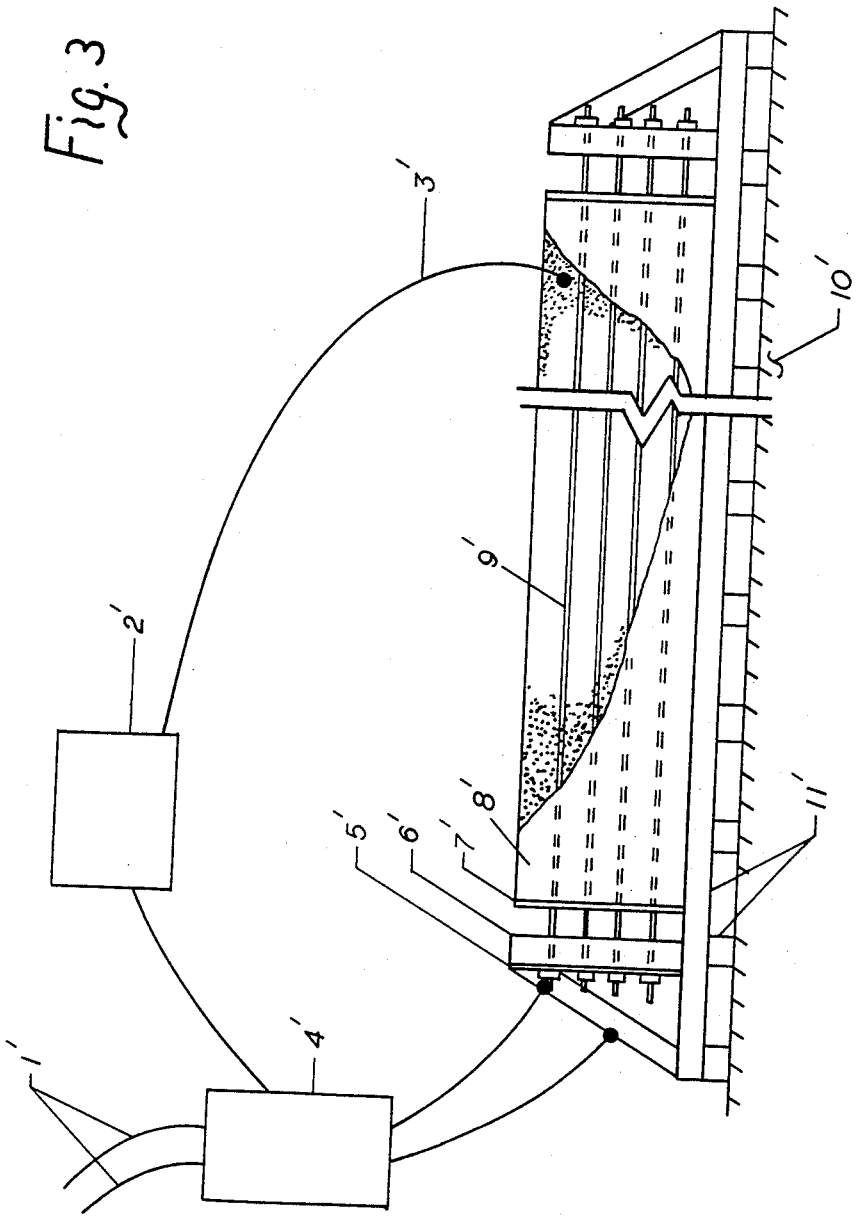

4,899,031

PULSED ELECTRICAL HEATING OF CONCRETE

BACKGROUND OF THE INVENTION

Previous studies and applications for electric curing have centered on using the concrete itself, prestressing wires, special high resistive wires, infrared, forms, etc., as a means of dissipating electric resistive type heating into the concrete. The feed of electric power into the system has been continuous. Problems with reduced strength have occurred due to micro-cracks developed due to high temperature gradients in the concrete adjacent to the heating media.

SUMMARY OF THE INVENTION

The purpose of this invention is to provide an inexpensive trouble free method for electrically heat curing concrete without reducing the strength of same.

Various other features of the method of the present invention will become obvious to those skilled in the art upon reading the disclosure set forth hereinafter.

BRIEF DESCRIPTION OF DRAWINGS

Referring now to the drawings, the system is shown in cut-away views of concrete slabs using heating cables, heating steel reinforcing wire, and tension cables.

FIG. 1 is a cut-away view of the system used in a concrete slab using heating cables.

FIG. 2 is a cut-away view of the system used in a concrete slab using steel reinforcing wire to conduct the pulsed electric current.

FIG. 3 is a cut-away view of the system used in a concrete slab containing tension cables and a programmable controller of the system.

DETAILED DESCRIPTION

Referring now to FIGS. 1 through 3, there are illustrations showing cut-away views of the system using various mediums for conducting the electric current through the concrete. The power source from the electric main 1 enters the switch box 2 (FIGS. 1 and 2), which is connected to the electric timer 3. Said timer is adjustable to various desired pulsed on and off settings and feeds the pulsed current into the transformer 4, which passes on through the junction box 5 and enters the heating cables 6 (FIG. 1). There the pulsed heat from said cables bleeds out into the concrete as programmed by the electrical timer 3. The delay time between electrical input pulses will allow the heat to flow into the entire concrete volume without excessive build-up of temperature near the heating element, thus maintaining uniform heat throughout the concrete. Reinforcing steel wire 7 is used to strengthen the finished concrete 8.

FIG. 2 shows the steel reinforcing wire 6 used as a medium for conducting the electric current through the concrete 10. The pulsed on and off current from the adjustable timer 3 passes through the transformer 4, travels through the junction box 5 and enters the grid assembly 6 at points 7. The circuit wire 8 and insulation 9 completes the electrical circuit, thus the steel reinforcing wire becomes the embedded heating grid for the concrete 10. The delay time between input pulses from the timer 3 allows the heat from said grid to bleed out into the concrete maintaining uniform heat throughout and preventing excessive build-up of temperature near said grid. By variation in the transformer 4, the output of the concrete grids can be regulated to provide the desired quantities of pulsed heat.

FIG. 3 shows a cut-away view of the tension cables 9' used as a medium for conducting the electric current through the concrete slab 8' and illustrates how a programmable controller 2' can be used for adjusting pulsed on and off current flow and how it can be governed by the information it receives from its probe 3', as to the conditions measured in and around the curing concrete. Upon receiving said information, the programmable controller 2' then directs the power supply 4' to adjust its functions accordingly, such as current, voltage and pulsed on and off timing. The electrical insulating block 5' illustrates the wiring connections with the tension cables 9' and show the support structure 6' for same, the base 10' and base support system 11'. This illustrates how the control of the pulsed heating system can be accomplished by using a programmable control system.

It is to be understood that the foregoing drawings and description of the invention is to be taken as a preferred embodiment and that various other modifications will occur to those skilled in the art upon reading the disclosure, however all changes and modifications that come within the spirit of the invention are desired to be protected.

I claim:

1. A method of supplying a pulsed flow of electric heat within green concrete for curing purposes, comprising the steps of
   a. having a designed form for molding concrete,
   b. positioning at selected locations within said form a medium for conducting electric heat within the form,
   c. having means for wiring the medium to an electric timer equipped to control the flow of electric current passing through said timer to multiple selections of pulsed on and off cycles and having means for furnishing electric current to said timer,
   d. placing soft green concrete in the form and surrounding the medium with said concrete to allow the electric timer to deliver selected on and off pulsed heat within said concrete.

2. A method of supplying a pulsed flow of electric heat within green concrete for curing purposes, comprising the steps of
   a. having a designed form for molding concrete,
   b. positioning at selected locations within said form a medium for conducting electric heat within the form,
   c. wiring said medium to a controllable power source that is controlled by a programmable controller, said power source wired to an electric power main,
   d. placing soft green concrete in the form and surrounding the medium with said concrete to allow the programmable controller to instruct the controllable power source to deliver selected on and off pulsed heat within the concrete.

3. A method of supplying a pulsed flow of electric heat within green concrete for curing purposes, comprising the steps of
   a. having a designed form for molding concrete,
   b. positioning at selected locations within said form a medium for conducting electric heat within the form,
   c. wiring said medium to a controllable power source that is controlled by a programmable controller which is governed by information from at least one probe selectively positioned within the form, said power source being wired to an electric power main, d. placing soft green concrete in the form and surrounding the medium and probe with said concrete, to allow the programmable controller, that continuously uses its probe information, to instruct the controllable power source to deliver selected on and off pulsed heat within said concrete.

* * * * *